United States Patent [19]
Cloutier et al.

[11] Patent Number: 5,130,745
[45] Date of Patent: Jul. 14, 1992

[54] FILM INFORMATION EXCHANGE SYSTEM USING DEDICATED MAGNETIC TRACKS ON FILM

[75] Inventors: Robert P. Cloutier, Spencerport; William C. Atkinson, Webster; Michael L. Wash, Pittsford; Arthur A. Whitfield, Rochester, all of N.Y.

[73] Assignee: Eastman Kodak Company, Rochester, N.Y.

[21] Appl. No.: 685,261

[22] Filed: Apr. 12, 1991

Related U.S. Application Data

[63] Continuation of Ser. No. 255,693, Oct. 7, 1988, abandoned.

[51] Int. Cl.$^5$ .................... G03B 17/24; G03B 27/52
[52] U.S. Cl. ..................... 355/40; 352/236; 354/76; 354/106; 360/1; 430/496
[58] Field of Search ............... 354/75, 108, 106, 109, 354/76; 352/37, 92, 236; 355/40; 360/1, 2, 3; 430/140, 495, 496, 523

[56] References Cited

U.S. PATENT DOCUMENTS

| | | | |
|---|---|---|---|
| 2,937,914 | 5/1960 | Blake | 346/107 |
| 3,004,467 | 8/1961 | Zschau | 352/37 |
| 3,379,095 | 10/1968 | Kaprelian | 88/28 |

(List continued on next page.)

FOREIGN PATENT DOCUMENTS

| | | |
|---|---|---|
| 0011086 | 9/1980 | European Pat. Off. . |
| 0100549 | 12/1984 | European Pat. Off. . |
| 0142626 | 1/1985 | European Pat. Off. . |
| 246799A | 11/1987 | European Pat. Off. . |
| 0293887 | 6/1988 | European Pat. Off. . |
| 1422041 | 5/1968 | Fed. Rep. of Germany . |
| 2159466 | 6/1973 | Fed. Rep. of Germany . |
| 2746036 | 10/1977 | Fed. Rep. of Germany . |
| 2295453 | 7/1976 | France . |
| 2382325 | 3/1978 | France . |
| 225088A3 | 10/1973 | German Democratic Rep. . |
| 53106115 | 2/1977 | Japan . |
| 5695232 | 12/1979 | Japan . |
| 58128893 | 1/1982 | Japan . |
| 59104635 | 12/1982 | Japan . |
| 59201053 | 4/1983 | Japan . |
| 6014239 | 7/1983 | Japan . |
| 59162549 | 8/1983 | Japan . |
| 6053952 | 9/1983 | Japan . |
| 60-185940 | 9/1985 | Japan . |
| 60-185941 | 9/1985 | Japan . |
| 61-246730 | 11/1986 | Japan . |
| 63165835 | 12/1986 | Japan . |
| 63165836 | 12/1986 | Japan . |
| 62-112141 | 5/1987 | Japan . |
| 62-112142 | 5/1987 | Japan . |
| 2083652 | 9/1980 | United Kingdom . |
| 2083441B | 7/1984 | United Kingdom . |
| 2158955A | 11/1985 | United Kingdom . |

OTHER PUBLICATIONS

*Research Disclosure,* 1984, H. J. Krall, "Magnetically Positioned Photographic Film", p. 115.
Eastman Kodak Company *Data Code Magnetic Control Surface,* 1983.
"DATAKODE Magnetic Control Surface", Eastman Kodak Company, 1983, pp. 1–3.
"Technical Experience with Datakode Magnetic Control Surface", Eastman Kodak Company, 1984, pp. 1–24.
SMPTE Journal, vol. 93, No. 8, Aug. 1984, Scarsdale, New Jersey, pp. 730–745; R. E. Uhlig "Technical experience with datakode TM magnetic control surface".

*Primary Examiner*—A. A. Mathews
*Attorney, Agent, or Firm*—Heslin & Rothenberg

[57] ABSTRACT

A virtually transparent magnetic layer is included as an additional layer in a photographic film strip. Information exchange between various users of the film such as, for example, the film manufacturer, the camera user, the dealer and photofinisher, is facilitated by plural longitudinal magnetic tracks on the film that begin and end within individual frames. Each track is dedicated to the writing and reading of a predetermined set of parameters relating to the corresponding frame, for easy access by a particular one of the various users. Each user has the capability to read and/or write information in self-identifying data fields in the corresponding tracks.

45 Claims, 11 Drawing Sheets

U.S. PATENT DOCUMENTS

| | | | |
|---|---|---|---|
| 3,603,974 | 9/1971 | Copeland | 346/23 |
| 3,718,074 | 2/1973 | Davis | 354/106 |
| 3,736,849 | 6/1973 | Thompson | 354/106 |
| 3,782,947 | 1/1974 | Krall | 96/67 |
| 3,797,025 | 3/1974 | Murphy, Jr. et al. | 354/77 |
| 3,807,851 | 4/1974 | Knox et al. | 353/120 |
| 3,810,218 | 5/1974 | Millett | 354/204 |
| 3,828,356 | 8/1974 | Wiers | 346/108 |
| 3,843,956 | 10/1974 | Kauneckas | 354/108 |
| 3,889,281 | 6/1975 | Taguchi et al. | 354/109 |
| 3,971,049 | 7/1976 | Ohmori et al. | 354/127 |
| 3,995,289 | 11/1976 | Shono | 354/109 |
| 4,001,846 | 1/1977 | Kauneckas | 354/105 |
| 4,025,931 | 5/1977 | Taguchi et al. | 354/105 |
| 4,042,298 | 8/1977 | Herrmann | 355/40 |
| 4,054,920 | 10/1977 | Kittag | 360/3 |
| 4,073,588 | 2/1978 | Zangenfeind et al. | 355/41 |
| 4,074,294 | 2/1978 | Fujita et al. | 354/106 |
| 4,079,388 | 3/1978 | Takahama et al. | 354/105 |
| 4,112,444 | 9/1978 | Yonemoto et al. | 354/106 |
| 4,117,502 | 9/1978 | Takeda et al. | 354/106 |
| 4,120,572 | 10/1978 | Grallert et al. | 352/92 |
| 4,150,882 | 4/1979 | Konick | 352/39 |
| 4,182,560 | 1/1980 | Oguchi et al. | 354/106 |
| 4,199,242 | 4/1980 | Hosomizu et al. | 354/145 |
| 4,211,558 | 7/1980 | Oguchi et al. | 430/359 |
| 4,215,920 | 8/1980 | Butler | 355/92 |
| 4,235,544 | 11/1980 | Yamada et al. | 354/106 |
| 4,251,156 | 2/1981 | Zimmerman et al. | 355/41 |
| 4,270,853 | 6/1981 | Hatada et al. | 354/76 |
| 4,270,854 | 6/1981 | Stemme et al. | 354/76 |
| 4,279,945 | 7/1981 | Audran et al. | 427/130 |
| 4,302,523 | 11/1981 | Audran et al. | 430/140 |
| 4,327,979 | 5/1982 | Tominaga et al. | 354/105 |
| 4,340,286 | 7/1982 | Carr | 354/105 |
| 4,344,683 | 8/1982 | Stemme | 354/106 |
| 4,349,272 | 9/1982 | Holthusen | 355/69 |
| 4,361,388 | 11/1982 | Mlcak et al. | 354/106 |
| 4,362,369 | 12/1982 | Kazami et al. | 354/106 |
| 4,365,882 | 12/1982 | Disbrow | 354/106 |
| 4,368,967 | 1/1983 | Imura | 354/106 |
| 4,384,771 | 5/1983 | Sakurada et al. | 354/105 |
| 4,400,457 | 8/1983 | Johnson | 430/140 |
| 4,422,752 | 12/1983 | Thurm et al. | 355/41 |
| 4,437,742 | 3/1984 | Taniguchi | 354/21 |
| 4,441,807 | 4/1984 | Bartz | 355/40 |
| 4,443,077 | 4/1984 | Tanikawa | 354/21 |
| 4,443,099 | 4/1984 | Linman et al. | 355/75 |
| 4,482,924 | 11/1984 | Brownstein | 358/302 |
| 4,493,547 | 1/1985 | Bridges | 354/424 |
| 4,497,552 | 2/1985 | Howard et al. | 354/106 |
| 4,500,183 | 2/1985 | Tanikawa | 354/21 |
| 4,511,229 | 4/1985 | Schwartz et al. | 354/20 |
| 4,515,452 | 5/1985 | Tsuzuki | 354/106 |
| 4,544,259 | 10/1985 | Kanaoka et al. | 355/1 |
| 4,548,492 | 10/1985 | Kanaoka et al. | 355/50 |
| 4,553,833 | 11/1985 | Kanaoka et al. | 355/40 |
| 4,554,591 | 12/1985 | Kee | 358/256 |
| 4,574,319 | 3/1986 | Konishi | 358/335 |
| 4,577,961 | 3/1986 | Terashita | 355/77 |
| 4,583,831 | 4/1986 | Harvey | 354/106 |
| 4,613,911 | 9/1986 | Ohta | 360/3 |
| 4,659,198 | 4/1987 | Beauviala et al. | 352/92 |
| 4,659,213 | 4/1987 | Matsumoto | 355/38 |
| 4,684,229 | 8/1987 | Utsugi | 354/106 |
| 4,689,696 | 8/1987 | Plummer | 358/333 |
| 4,702,580 | 10/1987 | Denner | 354/106 |
| 4,705,372 | 11/1987 | Lapeyre | 354/106 |
| 4,728,978 | 3/1988 | Inoue et al. | 354/289 |
| 4,736,215 | 4/1988 | Hudspeth et al. | 354/21 |
| 4,774,534 | 9/1988 | Kazumi et al. | 354/21 |
| 4,779,145 | 10/1988 | Lemelson | 360/2 |
| 4,797,713 | 1/1989 | Terashita et al. | 355/77 |
| 4,811,042 | 6/1989 | Cloutier | 354/105 |
| 4,860,037 | 11/1989 | Harvey | 354/105 X |

| TRACK | FRAME 0, 26 | FRAME 1-25 |
|---|---|---|
| Gen'l | FILM TYPE IDENT | |
| C0 | ID's<br>-OWNER (20)<br>-CAMERA (15)<br>-CAMERA DEALER (20)<br>-DIRECTORY OF WRITTEN INFORMATION | CAMERA PRIMARY<br>-DATE<br>-TIME (ACTUAL, ELAPSED)<br>-ORIENTATION REVERSE WIND VS. FORWARD WIND CAMERA<br>-LUMINANCE LEVEL<br>-FLASH FIRE<br>-SERIES SCENE<br>-CAMERA ROLL #<br>-CAMERA EXPOSURE #<br>-FRAME # |
| C1 | | CAMERA SECONDARY<br>-EOS FEATURES |
| C2 | | USER INPUT |
| F0 | ID's<br>-OWNER (60)<br>-P/F DEALER ID (20)<br>-LAB (20)<br>-USER INPUT FEATURE IND.<br>-END OF ORDER FLAG | USER INPUT |
| F1 | INITIAL ORDER INFO<br>-ORDER REQUEST<br>-ROLL ID<br>-FILM TYPE<br>-COMPLETED ORDER INFO<br>-CLASSIFICATION FLAG | PROCESS INFORMATION<br>-CLASSIFICATION<br>-INSPECTION INFORMATION<br>-MAKEOVER CORRECTION<br>-PRINTS MADE |
| F2 | REORDER/MAKEOVER INFO<br>-ORDER REQUEST<br>-ORDER TYPE (REO/MO)<br>-COMPLETED ORDER INFO | PROCESS INFORMATION<br>-PRINTS MADE |
| F3 | FILM-TO-VIDEO TRACK | |
| F4 | ELECTRONIC PRINT PROCESSING TRACK | |
| F5-F14 | RESERVED FOR AUDIO | |

FIG. 5

| PRE-RECORDED BY CAMERA (ON FILM) | | RECORDED AT RETAIL ORDER STATION | |
|---|---|---|---|
| -CAMERA OWNER IDENTIFICATION | AA | -CUSTOMER IDENTIFICATION | GA |
| -CAMERA IDENTIFICATION NO. | AB | -ORDER ENTRY DATE/TIME | GB |
| -ISO USED BY CAMERA | AC | -CUSTOMER CHARGE CARD NUMBER | GC |
| -DEALER ID | AD | -RETAILER IDENTIFICATION | GD |
| | | -FRAME NUMBERS TO BE PRINTED | GE |
| -REVERSE WIND | AE | -NUMBER PRINTS PER NEGATIVE | GF |
| -SPECIAL USE INSTRUCTIONS, MRQ, ETC. | AF | -PRINT SIZE | GG |
| | | -MASK CHOICE | GH |
| | | -CROPPING INFORMATION | GI |
| | | -PAPER SURFACE FINISH | GJ |
| | | -ORDER RETURN DATE | GK |
| | | -METHOD OF RETURN | GL |
| | | -SPECIAL EFFECTS | GM |
| | | -SPECIAL SERVICES | GN |
| | | -PUSH PROCESS | GO |

| RECORDED BY CAMERA AT EACH FRAME (ON FILM) | | RECORDED AT PHOTOFINISHER | |
|---|---|---|---|
| -METERING FIDUCIAL | BA | PF DEALER ID | HA |
| | | LAB ID | HB |
| -DATE OF EXPOSURE | BB | END OF ORDER FLAG | HC |
| -TIME OF EXPOSURE | BC | CLASSIFICATION FLAG | HD |
| -CAMERA ORIENTATION | CA | CLASSIFICATION | HE |
| -F NUMBER | CB | MAKEOVER FLAG | HF |
| -SHUTTER SPEED | CC | MAKEOVER CORRECTION | HG |
| -FOCAL LENGTH | CD | UNSALVAGEABLE FLAG | HH |
| -FLASH FIRE | CE | NO. OF PRINTS MADE | HI |
| -FLASH RETURN | CF | | |
| -FILL FLASH RATIO | CG | | |
| -BACKLIT SCENE INDICATOR | CH | | |
| -EXPOSURE BIAS | CI | | |
| -SERIES SCENE | CJ | | |
| -ILLUMINANT COLOR TEMPERATURE | CK | | |
| -LUMINANCE RANGE | CL | | |
| -LUMINANCE LEVEL | CM | | |
| -SUBJECT DISTANCE | CN | | |
| -BEYOND CAMERA EXPOSURE RANGE | CO | | |
| -BEYOND MINIMUM SHUTTER RANGE | CP | | |
| -PSEUDO FORMAT-(TELE/PAN) | DA | | |
| -SCENE CLASSIFICATION | DB | | |
| -REVERSE WIND CAMERA | DC | | |
| -TEMPERATURE | DD | | |
| -USER INPUT | EA | | |
| -IDENTIFY PRINCIPAL SUBJECT | EB | | |
| -SUBJECT MOTION | EC | | |
| -CAMERA MOTION | ED | | |
| -STANDARD EXPOSURE | EE | | |
| -CAMERA FRAME NUMBER | FA | | |
| -CAMERA ROLL NUMBER | FB | | |
| -PUSH PROCESS | FC | | |
| -FRAME NUMBER | FD | | |
| -ELAPSED TIME | FE | | |

| CHARACTER | 6-BIT BYTE |
|---|---|
| 0 | 0 1 0 0 0 0 |
| 1 | 0 1 0 0 0 1 |
| 2 | 0 1 0 0 1 0 |
| 3 | 0 1 0 0 1 1 |
| 4 | 0 1 0 1 0 0 |
| 5 | 0 1 0 1 0 1 |
| 6 | 0 1 0 1 1 0 |
| 7 | 0 1 0 1 1 1 |
| 8 | 0 1 1 0 0 0 |
| 9 | 0 1 1 0 0 1 |
| A | 1 0 0 0 0 1 |
| B | 1 0 0 0 1 0 |
| C | 1 0 0 0 1 1 |
| D | 1 0 0 1 0 0 |
| E | 1 0 0 1 0 1 |
| F | 1 0 0 1 1 0 |
| G | 1 0 0 1 1 1 |
| H | 1 0 1 0 0 0 |
| I | 1 0 1 0 0 1 |
| J | 1 0 1 0 1 0 |
| K | 1 0 1 0 1 1 |
| L | 1 0 1 1 0 0 |
| M | 1 0 1 1 0 1 |
| N | 1 0 1 1 1 0 |
| O | 1 0 1 1 1 1 |
| P | 1 1 0 0 0 0 |
| Q | 1 1 0 0 0 1 |
| R | 1 1 0 0 1 0 |
| S | 1 1 0 0 1 1 |
| T | 1 1 0 1 0 0 |
| U | 1 1 0 1 0 1 |
| V | 1 1 0 1 1 0 |
| W | 1 1 0 1 1 1 |
| X | 1 1 1 0 0 0 |
| Y | 1 1 1 0 0 1 |
| Z | 1 1 1 0 1 0 |
| SPACE | 0 0 0 0 0 0 |
| = | 0 1 1 1 0 1 |
| $ | 0 0 0 1 0 0 |
| - | 0 0 1 1 0 1 |
| ° | 0 0 1 1 1 0 |
| / | 0 0 1 1 1 1 |

| Char | b1 | b2 | b3 | b4 | b5 | b6 | Description |
|---|---|---|---|---|---|---|---|
| ; | 0 | 0 | 0 | 0 | 0 | 1 | FILM REVERSED START SENTINEL (FIRST CHARACTER) |
| : | 0 | 0 | 0 | 0 | 1 | 0 | |
| * | 0 | 0 | 0 | 0 | 1 | 1 | |
| & | 0 | 0 | 0 | 1 | 0 | 0 | |
| . | 0 | 0 | 0 | 1 | 0 | 1 | END SENTINEL (FIRST CHARACTER) AND FILM-REVERSED VERSION OF SAME |
| − | 0 | 0 | 0 | 1 | 1 | 0 | |
| ) | 0 | 0 | 0 | 1 | 1 | 1 | |
| * | 0 | 0 | 1 | 0 | 0 | 0 | |
| + | 0 | 0 | 1 | 0 | 0 | 1 | |
| , | 0 | 0 | 1 | 0 | 1 | 0 | |
| . | 0 | 0 | 1 | 0 | 1 | 1 | ID SENTINEL (USED BY ALL EXCEPT MFG.) |
| / | 0 | 0 | 1 | 1 | 0 | 0 | |
| < | 0 | 0 | 1 | 1 | 0 | 1 | |
| > | 0 | 0 | 1 | 1 | 1 | 0 | |
| ? | 0 | 0 | 1 | 1 | 1 | 1 | START SENTINEL (FIRST CHARACTER) |
| @ | 0 | 1 | 0 | 0 | 0 | 0 | FILM REVERSED 2ND CHARACTER OF START SENTINEL AND END SENTINEL |
| _ | 0 | 1 | 1 | 1 | 0 | 1 | ID SENTINEL (USED ONLY BY FILM MFG) |
| / | 0 | 1 | 1 | 1 | 1 | 0 | |
| | | 0 | 1 | 1 | 1 | 1 | 1 | START SENTINEL (2ND CHARACTER) AND END SENTINEL (2ND CHARACTER) |
| ( | 1 | 1 | 1 | 1 | 1 | 0 | |
| — | 1 | 1 | 1 | 1 | 1 | 1 | |

FIG. 9

FILM INFORMATION EXCHANGE SYSTEM USING DEDICATED MAGNETIC TRACKS ON FILM

CROSS REFERENCE TO RELATED APPLICATIONS

This application is a continuation of U.S. Ser. No. 07/255,693 filed on Oct. 7, 1988 now abandoned.

This application discloses subject matter related to subject matter disclosed in; U.S. patent application Ser. No. 391,687 entitled "Frame-by-Frame Data Recording Film Information Exchange System Using Dedicated Magnetic Tracks on Film" by Robert P. Cloutier et al. now abandoned; U.S. Pat. No. 4,965,627 entitled "Film Information Exchange System Using Dedicated Magnetic Tracks on Film with Virtual Data Identifiers" by Gary L. Robison; U.S. Pat. No. 4,977,419 entitled "Self-Clocking Encoding/Decoding Film Information Exchange System Using Dedicated Magnetic Tracks on Film" by Michael L. Wash et al.; U.S. Pat. No. 2,029,313 entitled "Photofinishing Apparatus with Film Information Exchange System Using Dedicated Magnetic Tracks on Film" by Gary L. Robison et al.; U.S. Pat. No. 5,021,820 entitled "Order Entry Process for Magnetically Encodable Film with Dedicated Magnetic Tracks" by Gary L. Robison, et al; U.S. Pat. No. 4,965,626 entitled "Printing and Makeover Process for Magnetically Encodable Film with Dedicated Magnetic Tracks" by Gary L. Robison et al.; U.S. Pat. No. 4,975,732 entitled "Finishing Process for Magnetically Encodable Film with Dedicated Magnetic Tracks" by Gary L. Robison et al; U.S. Pat. No. 4,965,575 entitled "Data Alignment Circuit and Method For Self-Clocking Encoded Data" by Michael L. Wash; U.S. patent application Ser. No. 255,002 entitled "Film-To-Video Player Using Dedicated Magnetic Tracks on Film" by Michael L. Wash, now abandoned; U.S. Pat. No. 4,974,096 entitled "Photofinishing Process With Film-To-Video Printer Using Dedicated Magnetic Tracks On Film" by Michael L. Wash; U.S. Pat. No. 5,006,873 entitled "Implicit Mid Roll Interrupt Protection Code For Camera Using Dedicated Magnetic Tracks on Film"; all assigned to the assignee of the present application.

BACKGROUND OF THE INVENTION

Limitations of Current Consumer Photography Technology

Communication between the camera user and the dealer or photofinisher typically requires written forms which are filled out by the user, usually well after a given scene has been photographed. Thus, in addition to the inconvenience of filling out such a form, scene-related information is typically lost or forgotten. Such information may include the user's desire to not have a particular frame printed or to have several prints made from a given frame, for example. Such information may also include the photographic parameters of the scene, observed by the user or by a sensor, which would have aided the photofinisher's classification of the scene to increase the quality of the prints made from the film.

Several factors reduce the efficiency of the overall photofinishing process. For example, in a large photofinishing laboratory not operating on a 24 hour per day basis, the film processing equipment must lie dormant for a period of time at the beginning of each work day until enough incoming customer film has been sorted to form one batch of a minimum number (e.g. 70) of film strips of the same type (such as color negative 35 mm film) to justify running the printing equipment. Of course, undeveloped film (regular customer orders) must be separated from developed film (print re-orders).

More significant sources of inefficiency in the photofinishing process include the mechanical steps required to maintain proper correspondence between each film strip and the prints made from it, as well as the customer's identity. These mechanical steps include the sorting and handling of each form or envelope originally filled out by the customer so that the envelope follows the customer's film strip throughout the photofinishing process and winds up with the corresponding set of prints.

One of the most significant sources of inefficiency in the photofinishing process arises from the necessity of reprinting an image from a particular frame on a customer's film strip whenever inspection reveals that the corresponding original print was incorrectly made (usually by an incorrect exposure of the photosensitive print paper to the developed film negative image). In order to replace the original print with a better (so-called "makeover") print, the exposure conditions ("classification") used to make the original print from the negative film image must first be corrected. The particular film negative frame in question must be re-classified and then reprinted while preserving the original prints of the other frames. The mechanical steps involved here include notching the prints to indicate the boundaries between adjacent prints and between adjacent orders in a roll of prints, as well as marking any original print requiring a makeover. Such mechanical indicia must be carefully followed in a labor intensive procedure in order to ensure that proper correspondence between each film strip and the corresponding original prints, makeover prints and customer order form (envelope) is never lost.

The problem of managing makeover prints is so great that one solution has been to use an off-line disk memory to automatically keep track of the location of frames requiring makeover prints. This system is called the Automatic Makeover system, or AMOE. Unfortunately, the AMOE system requires that the disk memory never loose synchronization with the film/frame location, and fails otherwise.

Problems to be Solved by the Invention

Recording of information on the film has been loosely suggested as one possible way around some of the limitations described above. These suggestions have ranged from optical recording of eye-readable symbols or machine readable symbols to the magnetic recording of machine readable data. Of course, optical recording on the film has only limited use, because once the film has been developed, no further recording may be done. Furthermore, the information must be restricted to those limited areas on the film not occupied by the camera-exposed image of each frame, a significant limitation on the amount of information that can be recorded.

With magnetic recording in a virtually transparent magnetic layer, high density recording may be done everywhere on the film including in the image area, so that all relevant information theoretically could be recorded with each frame on the film. However, what has not been recognized in the prior art is that complete exploitation of the potential capabilities of magnetic recording on film results in an unwieldy mass of data being recorded on the film, various bits of which must be separately accessed at various stages of the film use by camera and photofinisher. In such a scenario, the photofinisher in particular must find a certain needle of data in a massive haystack of data at a given step in the photofinishing process. For example, the classifier may require access to camera-recorded data specifying camera orientation for each frame, while the finishing station may require access to data recorded during print inspection specifying for each frame whether a makeover print was to be made. Therefore, one problem is how to record all of the required data in each frame on the film while permitting any stage of the photofinisher process to instantly access a particular piece of data in a given frame or to instantly access an area unoccupied by other data for recording of additional data.

Another problem arises if the accommodation of magnetic reading/writing on the film by both the camera and the various dealer and photofinishing stages precludes the photofinisher from reading/writing on film formats (e.g. 110 or 126 film) adapted to ordinary cameras not having magnetic read/write capability. The problem here is how to permit the photofinisher to use magnetic recording on film without regard to the format of the film or the type of camera used, using the same magnetic recording format and hardware for all cases. Solving this last problem would permit all film for all cameras to include the additional magnetic layer, for photofinishing with the same magnetic read/write format and automated protocols using the film magnetic layer as a frame-by-frame scratch pad memory.

SUMMARY OF THE INVENTION

Magnetic reading and writing of information in a virtually transparent magnetic layer in the film during each stage of film use and film processing is restricted to certain dedicated parallel tracks extending longitudinally along the length of the film, the choice of track being determined in accordance with the particular information being recorded. Magnetic reading/writing is performed with transport of the film by the camera during field use and during transport of the film by the dealer or photofinisher during film processing, printing, etc. The tracks are dedicated by universal pre-arrangement to certain sets of parameters or information, each set being of particular interest to a certain stage in the use of the film, the various stages including the camera, the dealer order entry station, the photofinisher order entry station, the classifier, the printer, the inspection or re-classifier station and the enveloper-sorter station.

The photofinisher tracks occupy the principal image area of each frame, so as to maximize the number of tracks available to the photofinisher and to render the format of these tracks virtually immune to any differences between various film formats or film perforation patterns. The photofinisher tracks therefore have a universally applicable format and may be used for applications beyond photofinishing, such as film-to-video conversion. Thus, the term "photofinisher tracks" or photofinisher-dedicated tracks is used in this specification in a generic sense, and includes those tracks reserved for the photofinisher as well as those tracks reserved for use by a film-to-video player, etc.

The camera tracks are present only in film adapted for use in cameras having magnetic read/write capability. For this purpose, the camera tracks are accommodated along the film edges, without impacting the photofinisher track locations, by interruption of the usual film perforation pattern along the film edges. In the preferred embodiment, each perforation is located alongside an image area of a corresponding frame, while the camera tracks are located within each frame along the film edges between successive perforations. This feature accommodates camera tracks without reducing the number of recording tracks on the film for all other uses, while at the same time permitting the photofinisher tracks to have the same format and configuration for all types of film.

The information to be recorded during all of the various stages of the film use (camera, developing, classifying, printing, etc.) is grouped and allocated by pre-arrangement among the various tracks in such a manner that each stage easily accesses the location of the information peculiar to that stage without having to search through information irrelevant to that stage. Preferably, each stage need merely find a particular one (or more) of the dedicated tracks in order to locate the information it must read or to find the proper location for writing information which it must store, with a minimum of searching through recorded data.

In a preferred embodiment of the invention, the various types of information are allocated among the dedicated tracks in accordance with groups of related information types or parameters, some individual groups being used by more than one stage of the film use cycle. Furthermore, in this preferred embodiment, information common to all frames of the film is in dedicated tracks on the film leader. Specifically, information common to all frames, such as film type, camera type, owner identification, a directory of written information and the like are recorded in a first camera track (near one film edge) on the film leader. This first camera track is designated track C0 while the film leader is designated frame 0. Scene related parameters automatically sensed by the camera (such as scene luminance, camera orientation, color temperature, flash fire, etc.) are recorded in track C0 in each subsequent frame (e.g. frames 1-25). A second camera track, track C1, is dedicated to the recording of secondary information, such as shutter speed, aperture size, etc. Clearly, an intelligent photofinishing classifier station, in attempting to compute the optimum exposure conditions to make a print, would read the data on track C0 in each of frames 1 through 25 (for example), while a finishing station, in attempting to maintain correspondence between a customer's film and his order form or envelope, would read the data on track C0 in frame 0. A similar sort of allocation of photofinisher dedicated tracks is employed, with customer print order request data being recorded in a first photofinisher track (F0) in frame 0, process data such as image classification and number of prints made in track F01, and makeover classification correction being recorded by frame in track F2, frames 1-25 (for example) and a summary of makeover data (e.g. total number of makeover prints) being recorded in track F2 in frame 0. Other photofinisher tracks may be dedicated to uses other than photofinishing, such as frame-by-frame user instructions for film-to-video players or film-to-video image converters.

In order to accommodate transversal film wander in the camera during film transport and recording, the magnetic heads in the camera (and the camera tracks) are sufficiently wider than the magnetic heads employed by the photofinisher (or other subsequent stages)

so that the photofinisher head does not leave any camera track when reading data from that track.

Solution to the Problems

The invention solves the data access problem faced by (among others) the photofinisher of "finding a needle in a haystack" because each stage need merely know which track has been dedicated to the data relevant to that stage, and may read the data from that track while ignoring all other data magnetically recorded on the film. Furthermore, in some cases the reading of data can be dispensed with entirely in order to make certain basic determinations about the film, by simply determining whether certain tracks are empty or not. For example, whether a particular strip of film has already been developed (and therefore was submitted for print reorder) is readily determined by seeing whether or not certain tracks (e.g. track F1 of frames 1-24) contain recorded data or not.

The invention solves the problem of making the photofinisher track format and the photofinisher magnetic read/write system universally applicable to all film formats, while maximizing the number of non-camera tracks, by placing the camera tracks at the film edges between perforations on special film having one perforation per frame. This is important, since the amount of data which may be read or written by the photofinisher to enhance his process efficiency (and by later stages in film use such as a film-to-video player) is far greater than data recorded by the camera. Of even greater importance is the fact that making the photofinisher's magnetic recording format of universal application permits him to employ the techniques of the invention for all magnetically coated films, not just film used by a camera having magnetic recording capability, thus requiring no new customer purchases in order to universally exploit the invention with all film types.

The use of narrower magnetic heads at the photofinisher takes advantage of the photofinisher's ability to avoid lateral movement of the film during processing without requiring the camera to have the same ability, thus reducing tolerance requirements and cost of cameras adapted to exploit the invention.

DESCRIPTION OF THE DRAWINGS

The invention may be understood by reference to the accompanying drawings, of which:

FIG. 5 is a block diagram illustrating the architecture of a read only memory containing a directory of track locations for various parameters which may be magnetically written or read on the film, in accordance with the dedicated track format of FIG. 1;

FIG. 7 illustrates an exemplary data identification code table for universal use with the data format of FIG. 6 by all stages of film use including camera and photofinisher;

FIG. 8 illustrates an exemplary symbol table for universal use with the data format of FIG. 6 by all stages of film use including camera and photofinisher;

FIG. 9 illustrates an exemplary reserved control symbol table for universal use with the data format of FIG. 6 by all stages of film use including camera and photofinisher;

DETAILED DESCRIPTION OF THE INVENTION

Preferred Format of the Dedicated Tracks on Film

Figure 1:
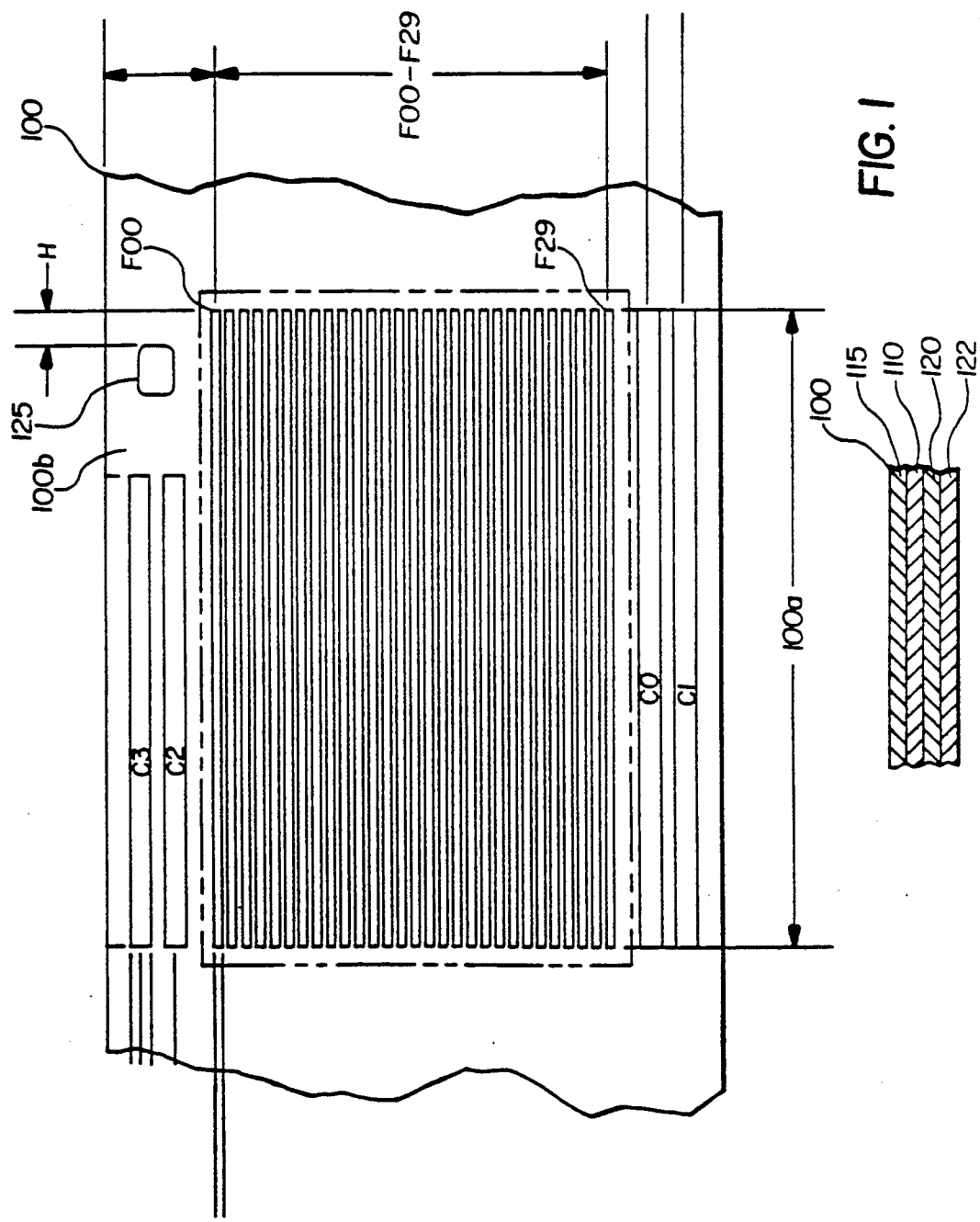
FIG. 1 is a diagram illustrating the parallel dedicated tracks in a virtually transparent magnetic layer on film having a special perforation format particularly adapted for use in cameras having a magnetic film read/write capability.

Referring to FIG. 1, a strip 100 of color negative film 35 millimeters wide includes a base 110, various well-known photo-chemical layers 115 on one side of the base 110 and a virtually transparent magnetic layer 120 on the other side. An anti-static and lubricating layer 122 covers the magnetic layer 120. The film strip 100 includes perforations 125 spaced along the film edge at regular intervals matching the pitch of a metering pawl in a camera adapted to use the film strip 100.

For purposes of recording data in the magnetic layer 120, each frame of the film strip 100 is divided into a plurality of predetermined parallel longitudinal track locations where magnetic tracks of data may be recorded. Each of the tracks is preferably labeled as shown in FIG. 1. In particular, the two outermost tracks along each edge of the film strip 100 are tracks C0, C1 and tracks C2, C3, respectively. The thirty innermost tracks are tracks F00 through F29. Each one of the outermost tracks C0 through C3 is dedicated to the recording of a particular type of information by a camera having magnetic recording capability, in accordance with a pre-arrangement universally established for all cameras and photofinishers. In a similar manner, each one of the innermost tracks is dedicated to the recording of a particular type of information by a particular type of photofinishing (or other) equipment, in accordance with the above-referenced universal pre-arrangement.

In order to accommodate the presence of the camera tracks C0 through C3 along the film strip edges, the perforations 125 are excluded from periodic imperforate edge regions 100a adjacent each exposed image area of a frame, and are restricted to the intermediate regions 100b. In the embodiment of FIG. 1, there is only one perforation in each intermediate region 100b. In the preferred embodiment, perforations lie along only one edge of the film strip 100.

Use of Dedicated Film Tracks in a Camera

Figure 2:
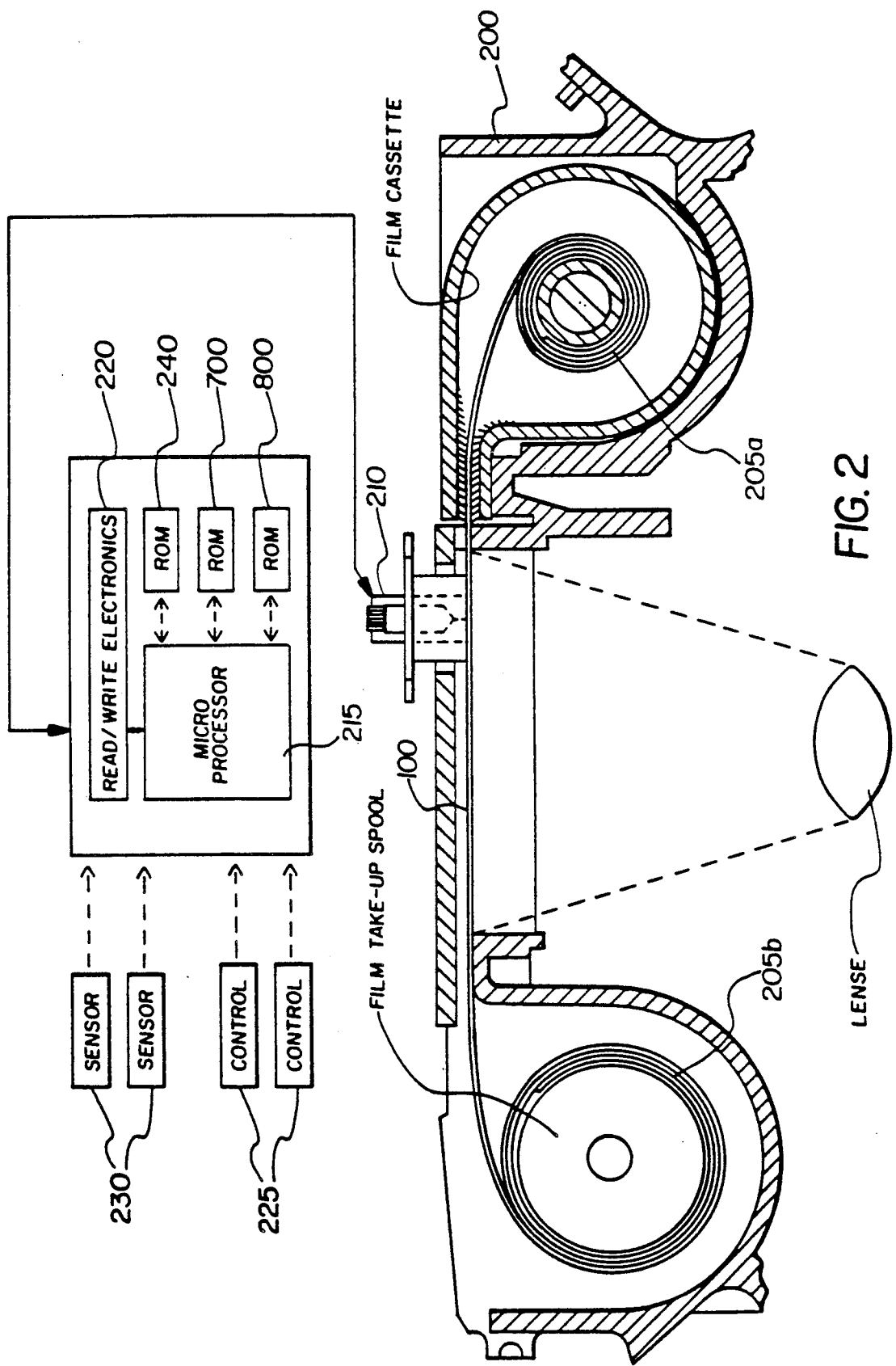
FIG. 2 is a simplified diagram illustrating the concept of a camera adapted to read or write data on the film of FIG. 1.

Referring to FIG. 2, a camera 200 transports the film strip 100 between the reels 205a,b, of a film cartridge and a take-up sprocket, respectively, conforming to the format of the perforations 125 of FIG. 1. The camera 200 includes a magnetic read/write head 210 facing the magnetic layer 120 on the unsensitized side of the film strip 100. A microprocessor 215 controls magnetic data recording or playback by the head 210 through head electronics 220.

The microprocessor 215 may accept order information to be magnetically recorded on the film strip 100 from the camera user through camera controls 225, such information pertaining to the number of prints desired for a given frame, by frame number, for example, or the name and address of the camera user for ultimate use by the photofinisher. The microprocessor 215 may also accept scene related information from scene sensors 230 to be magnetically recorded on the film strip 100 for ultimate use by the photofinisher. Such information may include camera orientation, scene luminance and the like.

The advantage of the longitudinal dedicated track format of FIG. 1 is that magnetic recording of data on the film strip 100 may be performed by the camera using a relatively stationary head (i.e. the head 210) by buffering all of the data to be recorded in a particular frame in a particular camera track and then transmitting the data to the head just as the film is being wound to the next frame.

The microprocessor 215 includes a read only memory 240 containing instructions sufficient to ensure that each type of information received is recorded in the correct one of the dedicated camera tracks C0–C3 in accordance with a universal pre-arrangement common to both the camera and the photofinisher. For this purpose, the microprocessor sorts and buffers each piece of information in compliance with the instructions stored in the read only memory 240. The nature of this pre-arrangement and the architecture of the read only memory will be described below in this specification.

Dedicated Tracks Format for Ordinary Cameras and Film

Figure 3:
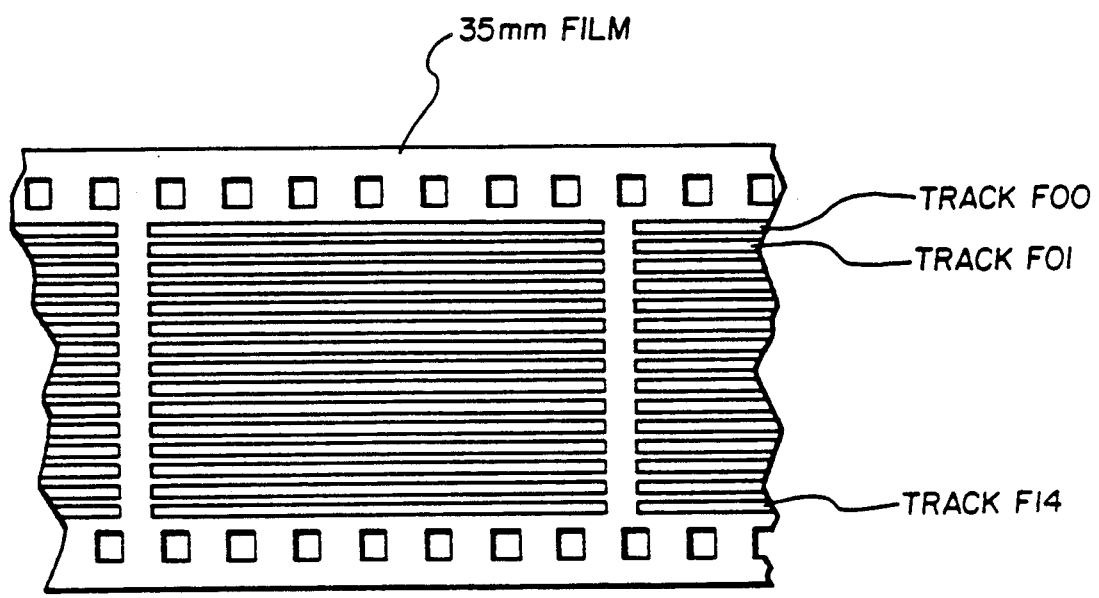
FIG. 3 is a diagram illustrating the parallel dedicated tracks in a virtually transparent magnetic layer on film having the currently ubiquitous perforation format used in ordinary cameras not having a magnetic film read/write capability.

The format of the photofinisher tracks F00 through F29 is the same regardless of the placement of the film perforations 125 of FIG. 1. Thus, a photofinisher may employ the same magnetic recording protocols and hardware on all types of film provided that a virtually transparent magnetic layer (such as the layer 120 of FIG. 1) is added to all types of film. Thus, referring to FIG. 3, ordinary 35 mm color negative film having the now-standard pattern of closely spaced perforations along both film edges accommodates the photofinisher tracks F00 through F14 having the same width and spacing as that of the special film format of FIG. 1. Although the perforations of FIG. 3 preclude the presence of the camera tracks C0 through C3, such film is not used in cameras having magnetic read/write capabilities and so the camera tracks need not be present. The advantage here is that all subsequent users of the film (i.e. photofinisher, film-to-video player, etc.) have been allocated the maximum number of tracks for all film formats, including those of FIG. 1 and of FIG. 3.

Camera and Photofinisher Dedicated Track Widths

Figure 4:
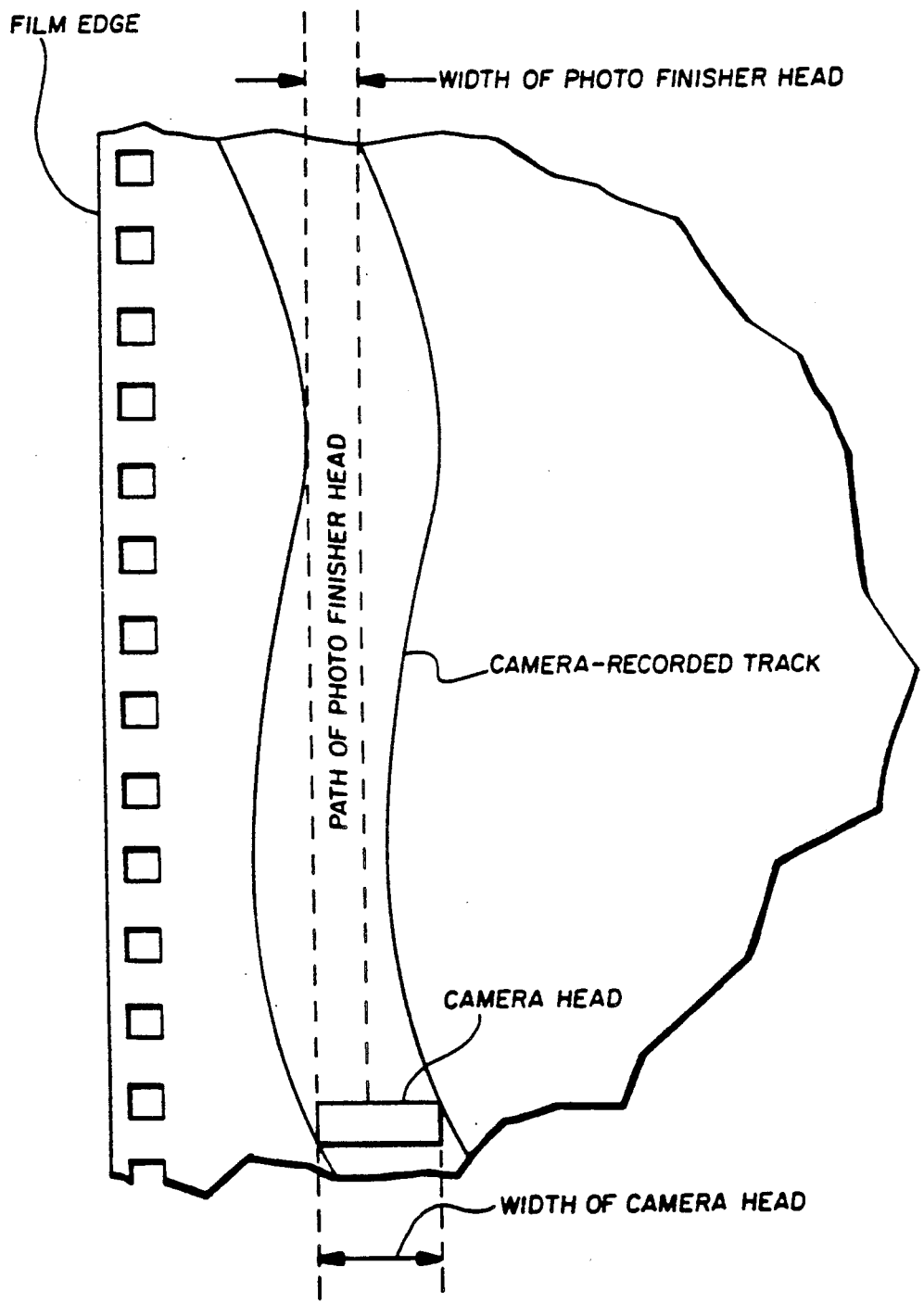
FIG. 4 is a diagram illustrating the accommodation of film wander in the camera of FIG. 2 by the use of different head widths at the various stages of film use.

Referring to FIG. 4, the width of the camera dedicated tracks C0–C3 is greater than that of the photofinisher tracks F00–F29. Of course, these track widths are controlled by the selection of the camera head widths and the photofinisher head widths. Preferably, the difference is sufficient to accommodate film wander in the camera during winding of the film while recording is performed by the head 210. Such wandering causes the camera tracks to have the meandering appearance illustrated in FIG. 4. Note in FIG. 4 that the photofinisher head, which must read the camera tracks, does not leave the camera track because it has a much smaller width.

Allocation of the Dedicated Tracks

FIG. 5 illustrates the allocation of the dedicated tracks, among the various information types, implemented by microcodes stored in the read only memory 240 of FIG. 2. There are four camera tracks and fifteen photofinisher tracks in each frame of the film exposed by the camera, these frames being designated frames 1 through 25. The film leader and trailer are designated frames 0 and 26, respectively. In general, the information recorded in frames 0 and 26 pertains to the film strip 100 as a whole, while the information recorded in each of frames 1 through 25 is unique for a particular frame. In FIG. 5, three of the four camera tracks are used by the camera, while three of the thirty "photofinisher" tracks are used by the photofinisher. The rest of the photofinisher tracks are reserved for the recording of film-to-video player instructions (track F03), electronic print processing instructions (track F04) and audio (track F05 through F14). The remaining tracks (F15–F29) are reserved for future uses.

Each of the tracks is dedicated to a particular group of information types which would in most cases be written or read together. Thus, frame 0 track C0 is reserved for information relating to the owner and the camera for recording by the camera. Similarly, frame 0 track F01 is reserved for information relating to the owner and the photofinisher for recording by the photofinisher. Likewise, track F00 of frame 0 is reserved for recording by the photofinisher—or by an order entry station—of the customer's instructions, the film type, and related information pertaining to the treatment of the order. Track F02 of frame 0 is reserved for the recording of historical information regarding the location of frames requiring makeover prints and print reorders by the customer, for use by the photofinisher during a subsequent print reorder by the customer.

Track C0 of each exposed frame (frames 1–25) is reserved for scene-related information for recording by the camera, such as scene luminance, camera orientation and the like. Similarly, track F01 is reserved for photofinisher information unique to a particular exposed frame, such as the classification of the negative image (determination of the proper print exposure), number of prints made, etc. The makeover classification correction, if any, is recorded in track F02.

The embodiment of FIG. 5 does not take into account all of the information types which may be magnetically recorded by the camera, retail order station or photofinisher on the film. However, the embodiment of FIG. 5 is an example of the manner in which all information types may be classified as to which track each one is to be assigned. The principle underlying the manner in which each information type is assigned to a particular track is that all information related to a particular transaction should be recorded on the same track, so that that track is dedicated to being written or read during those operations associated with that transaction.

The various transactions provided for in the embodiment of FIG. 5 are: (a) recording of customer data, including the customer address; (b) recording of scene-related information with each exposure, including parameters characterizing lighting conditions and camera exposure settings; (c) recording by the retail order station or photofinisher of customer order information, such as the number of prints desired; (d) the recording of inspection and makeover classification correction for a given frame by the photofinisher; (e) the recording of a summary of makeover data or print reorder data applicable to the entire film roll; (f) the recording of instructions for a film to video player; (g) the recording of instructions for electronic print processing; and (h) the recording of audio. In general (but not always) each of the magnetic recording tracks illustrated in FIG. 1 is dedicated to one of the foregoing transactions (a) through (h). The result is that during recording the amount of searching for an available recording location is minimized while during playback the amount of searching through data irrelevant for a particular operation is also minimized. For example, during the classification operation, in which the optimum print exposure condition for each frame is determined, all scene-related information potentially helpful in determining the proper classification may be obtained by reading data from a single track, namely the camera-dedicated track C0 in each exposed frame (frames 1-25). No other track need be read.

Preferred Data Architecture

Figure 6:
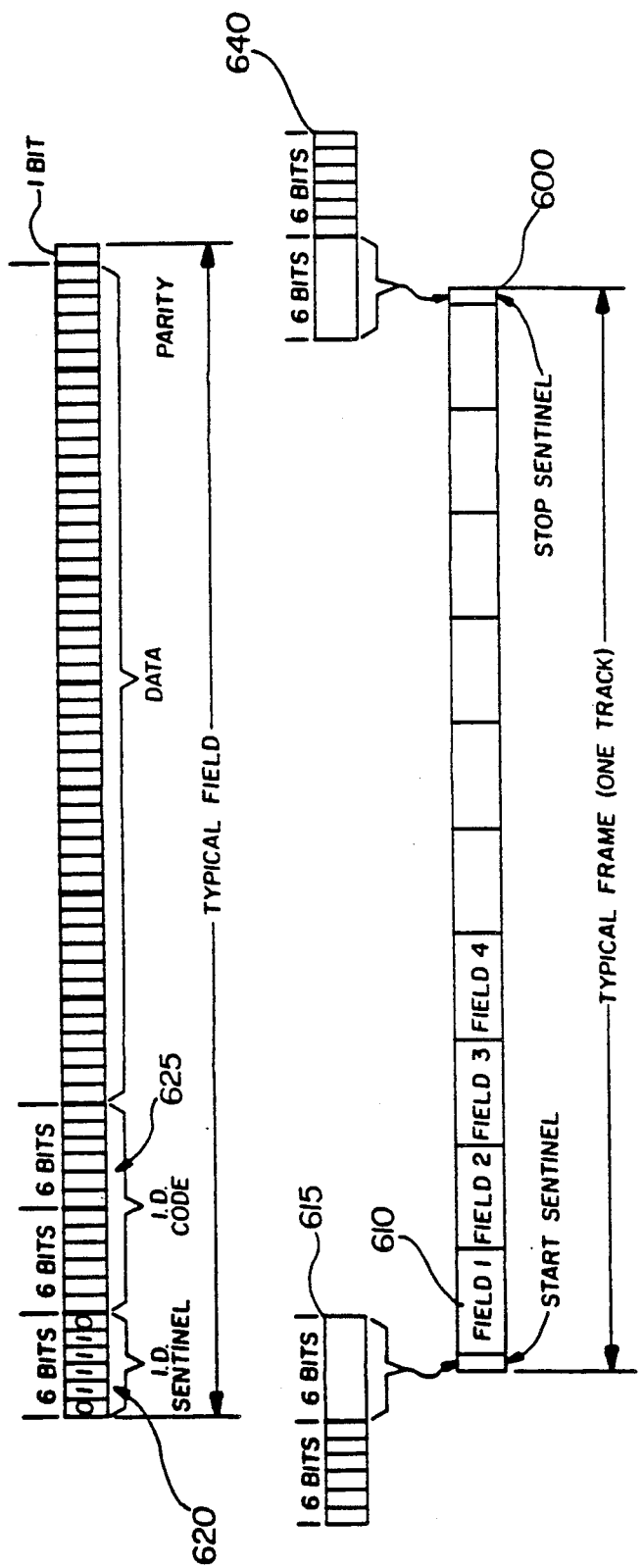
FIG. 6 is a diagram illustrating the preferred data format used in the dedicated tracks of FIG. 1 or FIG. 3.

As previously described herein with respect to FIG. 1, the data recorded magnetically on the film strip 100 is divided into frames exposed by the camera (frames 1-25) as well as the film leader (frame 0), the data within each frame being allocated among a plurality of dedicated tracks within the frame. FIG. 6 illustrates the preferred data format within each track of each frame.

In FIG. 6, each track 600 has the length of one frame and is divided into a plurality of fields 610. Each track 600 includes a predicate start sentinel 615 at its starting end (the left-hand end of the track in FIG. 6 where the head begins its scanning of the track 600). Each field includes a predicate ID sentinel 620 followed immediately by an ID code 625. The purpose of the track start sentinel 615 is to notify the read/write system in the camera or in the photofinishing hardware of the beginning location of the track 600. The purpose of the field ID sentinel 620 is to notify the same system of the beginning location of each succeeding field in the track 600. The purpose of the ID code 625 is to identify the type of information recorded in the following field.

The ID code is recorded in the beginning of each field and is determined by the information type which follows it. For example, if the camera 200 of FIG. 2 is about to record the level of scene luminance observed by sensors on the camera during exposure of the frame, the camera first causes a unique ID code to be recorded just ahead of the data representing the scene luminance level. In the simplest embodiment, a unique ID code is assigned to each parameter or information type which may be recorded on the film, so that the ID codes for all possible information types constitute a large dictionary. Inasmuch as the same dictionary must be employed by all stages in the life cycle of the film (e.g., camera, photofinisher, etc.), identical read only memories are provided at each stage, each of these memories embodying a universal ID code dictionary and controlling the reading and writing of ID codes at each stage of film use.

The advantage is that the placement of a particular parameter within the track 600 by the camera need not be previously known by the photofinisher in order for the photofinisher to be able to find that parameter on the track, since the photofinisher may simply refer to the corresponding ID code recorded by the camera. This same advantage holds between any other separate components, where one component writes data onto the film and the other independently reads the data from the film at a later time and, typically, at a different location.

One exemplary embodiment of a universal ID code dictionary is illustrated in FIG. 7. The dictionary of FIG. 7 is implemented as a set of microcodes stored in a read only memory 700 connected to the microprocessor of FIG. 2. The read only memory 700 of FIG. 7 defines a two-character ID code for each parameter which may be recorded. In this embodiment, the ID codes start at AA and end at HI, as just one possible example. While FIG. 7 depicts each ID code as being associated with the name of a particular parameter, in practice each ID code would be associated with the buffer or memory location of that parameter in the recording system so as to identify the corresponding data in terms of its location prior to being recorded. A system designer may use FIG. 7, for example, to construct the actual machine language content of the read only memory 700, depending upon the particular system design employed.

The binary bits recorded for each alphanumeric symbol representing a particular piece of information (e.g. scene luminance or customer address) or for one of the two-character ID codes of FIG. 7 are defined in accordance with the table of FIG. 8. The table of FIG. 8 is represented as a set of microcodes stored in a read only memory 800 connected to the microprocessor of 215. Each alphanumeric symbol is represented by a pattern of six binary bits. The read only memory 800 defines a universal symbol dictionary which is used to perform reading and writing of data on the film at all stages of film use. The table of FIG. 8 is derived from the ASCII standard symbols.

The read only memory 800 also defines the six-bit patterns which are reserved for control purposes and which therefore may not be used for information or data. These reserved symbols are set forth in the exemplary table of FIG. 9, and include the control symbols illustrated in FIG. 6, including the start symbol 615, the ID sentinel 620, a frame stop symbol 640 and the compliments of the start and stop sentinels 615 and 640. Other symbols are reserved in FIG. 9 in order to permit the skilled system designer to exercise other read or write controls as desired.

In FIG. 2, the microprocessor 215 in the camera 200, while referring to the read only memory 240 for the track locations of the various allowed parameters, must also refer to read only memories 700 and 800 for the universal ID code dictionary and universal symbol dictionary in order that subsequent readers of the data recorded by the camera 200 may properly interpret the data.

Exemplary Use of Dedicated Tracks in Photofinishing

Figure 10:
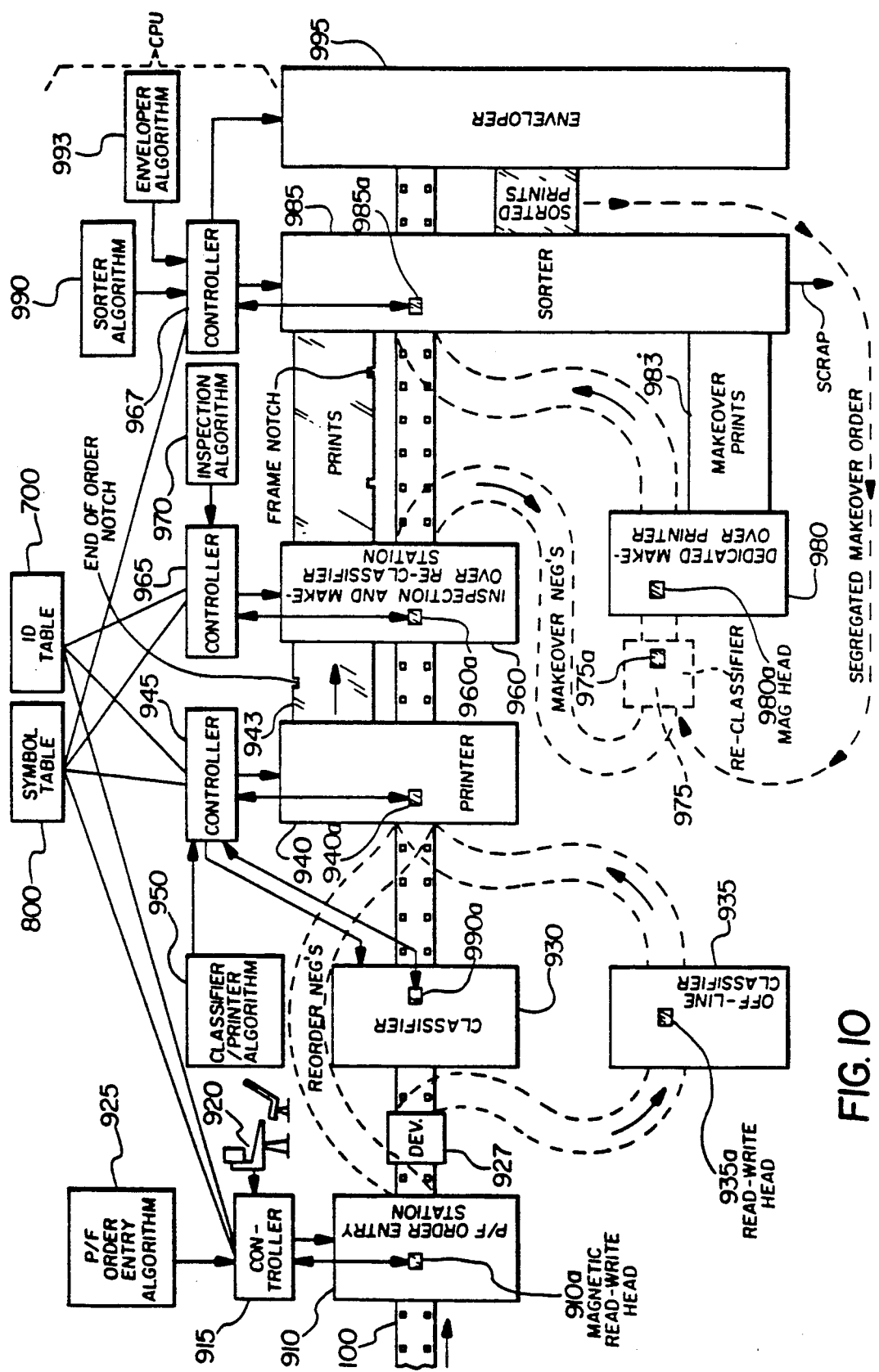
FIG. 10 is a block diagram illustrating a photofinishing system having magnetic read/write hardware including automated protocols which use the film of FIG.'s 1 or 3 as a scratch pad memory for increased efficiency or performance.

Use of the dedicated film tracks for magnetic recording of information by a camera has been described with reference to the example of FIG. 2. FIG. 10 illustrates one example of the use of the dedicated film tracks (of either FIG. 1 or FIG. 3) for magnetic reading and writing in a photofinishing system. In general, such a photofinishing system employs its own version of the read only memories 240, 700, 800 for track location, an ID code dictionary and a symbol dictionary.

In FIG. 10, the film strip 100 is removed from the cartridge (or at least partially extracted to expose its leader—frame 0) at an order entry station 910. The order entry station 910 may be located either at the dealer or at the photofinishing laboratory. The order entry station has a magnetic read/write system including a head 910a and a controller (microprocessor) 915 which executes an order entry algorithm stored in memory 925. This algorithm defines the correct track locations in frame 0 for the recording of customer-related information, including the number of prints desired, the customer's name and address, etc., entered in at a terminal 920 or read directly from one of the camera tracks. A developer 927 develops the film strip 100 to form a negative image in each exposed frame.

Figure 11:
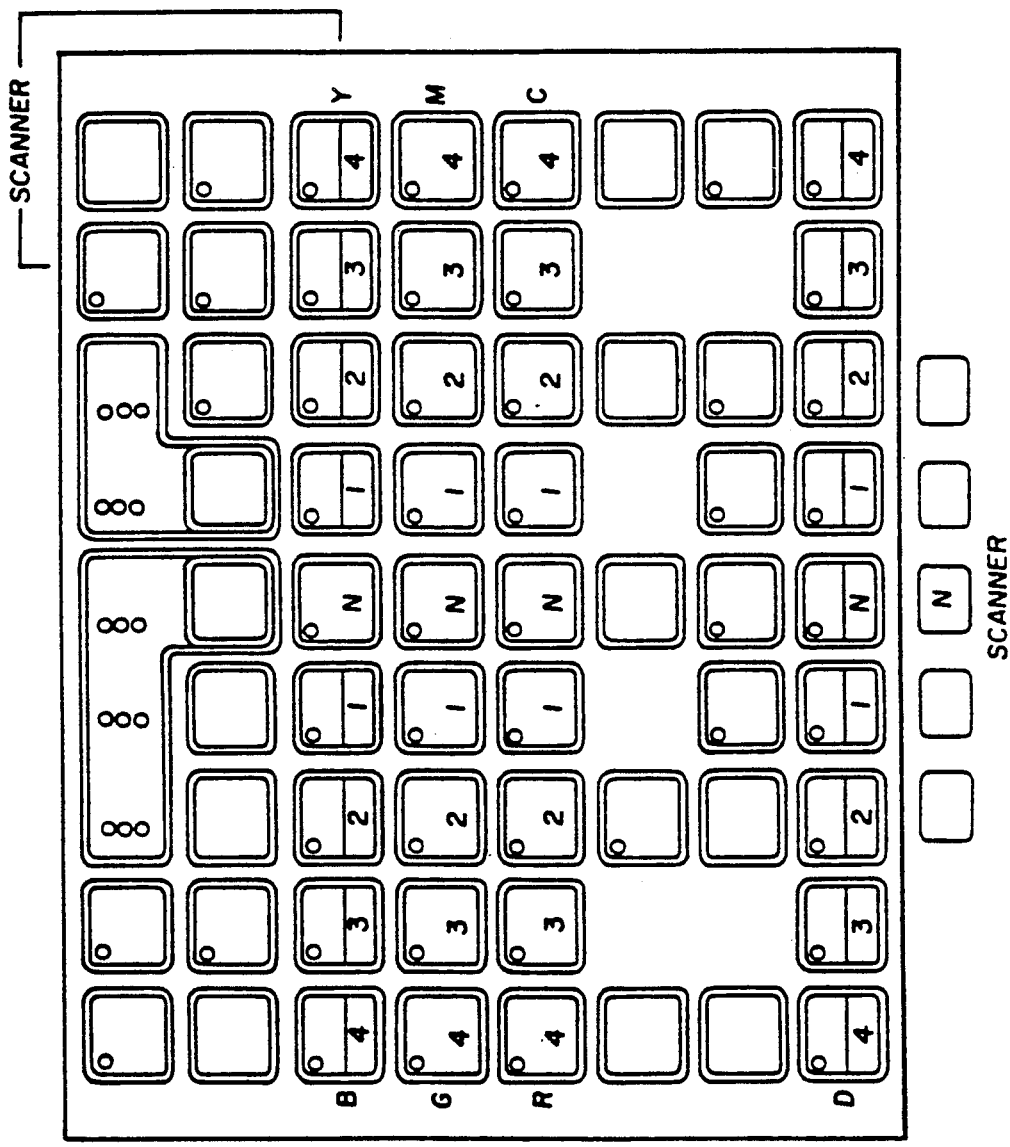
FIG. 11 illustrates a typical operator's keyboard used in the photofinishing system of FIG. 10 to classify developed negatives for correct print exposures.

The film strip 100 then enters a classifier 930 which determines the optimum print exposure condition for each frame on the film strip 100. The classifier may do this either manually under control of a human operator or automatically using an image sensor such as is done in the Eastman Kodak 3510 Color Printer or in the Eastman Kodak CLAS 35 Color Printer. An exemplary manual control terminal included in the manual version of the classifier 930 is illustrated in FIG. 11. The luminance value at which the photosensitive print paper is to be exposed through a given negative image may be changed from a nominal value (gray level) by arbitrary values $-4$ to $+4$ by pressing one of the appropriate buttons in the row of buttons labelled "D" on the left side of the terminal of FIG. 11. The intensity of red, green and blue light at which the print paper is exposed may be altered from pre-defined nominal values in similar manner by arbitrary values $-4$ to $+4$ by pushing the appropriate buttons in the corresponding one of the rows of buttons labelled "R", "G" and "B", respectively. The resulting classification (defined by the luminance, red, green and blue print exposure values) is recorded by the classifier's magnetic head 930a in the appropriate one of the dedicated tracks (in accordance with the track allocation defined in a read only memory such as the memory 240 of FIG. 5).

It should be noted that if data previously recorded on the film strip 100 indicates that it has been previously developed and printed (so that a classification value is stored in each frame in the appropriate track), then the developer 927 and the classifier 930 are automatically bypassed.

A printer 940 receives the film strip 100, reads the classification previously recorded in each frame by the classifier 930, and exposes one frame in a roll of photosensitive paper 937 through the corresponding negative frame with an exposure whose characteristics meet the recorded classification. The printer 940 includes its own magnetic read/write system, such as a magnetic head 940a, a controller 945 and a memory 950 storing a classifier/printer algorithm. This algorithm governs the magnetic reading and writing by the printer 940 and classifier 930 in accordance with the dedicated tracks format of FIG. 1 or FIG. 3. For example, the printer/classifier algorithm requires the controller 945 to determine whether camera tracks (tracks C0 through C3) were previously recorded on the film strip 100. If so, the dedicated track film format of FIG. 1 applies and scene-related information (if used by the classifier 930 to enhance the accuracy of the classification operation) may be found by reading the appropriate track. Likewise, the printer/classifier algorithm in the memory 950 tells the printer 940 where to find the classification value recorded in each frame by the classifier 930.

An operator at an inspection station views each of the prints on the print roll 943 to determine whether a makeover print is required for any of them. Under control of a controller 965 which executes an inspection algorithm stored in a memory 970, data is recorded on the film strip 100 in the appropriate track by the inspection station's magnetic head 960a reflecting the necessity (if any) of a makeover print in a given frame. Presumably the makeover was necessitated by an incorrect classification, and a correction to the original classification must be computed and recorded in the appropriate track on the film strip 100. In one embodiment, this is done by the inspection station 960 itself, while in another embodiment this is done at a separate re-classifier 975 having its own magnetic recording head 975a and recording system for this purpose. The film strip 100—which may be included in a roll of many such film strips—is sent to a makeover printer 980, typically by transferring the entire roll. The makeover printer 980 has its own magnetic read/write system, including magnetic head 980a, with which it may read the appropriate data in the appropriate tracks to determine which of the frames require makeover prints and, for each one of these, what the original classification value was and what the classification correction is. From this information, the makeover printer exposes the appropriate frames on the film strip 100 using the corrected classification values.

A roll of makeover prints 983 produced by the makeover printer 980, the roll of prints 943 produced by the printer 940 and the roll of developed film including the film strip 100 are all fed to a sorter 985. The sorter collates the individual original and makeover prints with the corresponding film strips into complete customer orders, discarding any original prints whenever corresponding makeover prints have been made. Whether a corresponding makeover print has been made is determined by the sorter 985 through its magnetic read/write system including a controller 967 which executes a sorter algorithm stored in a memory 990 and the sorter's magnetic head 985a. The head 985a is simply directed to read the required data from the appropriate one of the dedicated tracks on the film strip 100 by the controller 987, in accordance with the track allocation illustrated in FIG. 5.

While the invention has been described in detail by specific reference to preferred embodiments thereof, it is understood that other variations and modifications may be made without departing from the spirit and scope of the invention.

What is claimed is:

1. In an elongate photographic film strip characterized by successive frames, the improvement comprising:
   a virtually transparent magnetic layer;
   a plurality of longitudinal tracks magnetically recorded in said magnetic layer, different ones of said tracks containing magnetically recorded data relating to different data categories, respective ones of said tracks being dedicated to recording particular categories of data in accordance with a predetermined arrangement that allows different stages of use or processing of the film strip to readily access locations of data relevant to the stage without having to search through recorded data in categories irrelevant to that stage, and wherein at least one of said tracks comprises a plurality of different self-identifying data fields.

2. A method for recording data in an elongate photographic film strip characterized by successive frames and a virtually transparent magnetic layer, said method comprising:
dedicating respective ones of a plurality of predetermined longitudinal parallel track locations in said magnetic layer to respective predetermined information categories such that information categories relating to particular transactions are grouped together in said track locations;
assigning said data to one of said predetermined information categories;
magnetically recording said data in a magnetic track in the corresponding one of said plurality of predetermined longitudinal parallel track locations; and
wherein said predetermined information categories comprise:
information recorded by the manufacturer of said photographic film strip;
information recorded by a camera in which said film strip is exposed to successive scenes;
information recorded by an order entry station; and
information recorded by a photofinisher.

3. The method of claim 2 wherein data representing information within different ones of said predetermined categories is recorded in different respective ones of said parallel tracks, and substantially all data representing information related to a particular transaction is recorded on the same track.

4. The method of claim 2 wherein said recording step is characterized in that a track magnetically recorded by said manufacturer is wider than a track magnetically recorded by said camera, while said track magnetically recorded by said camera is wider than a track recorded by said photofinisher or order entry station.

5. The method of claim 2 wherein said film strip is characterized by a peripheral edge region outside of image areas of said successive frames and wherein said recording step is characterized in that said camera records a track in said peripheral region so as not to damage a latent photographic image previously exposed in ones of said frames.

6. The method of claim 5 wherein said recording step is further characterized in that said photofinisher or order entry station records plural tracks in said successive frames.

7. A method for recording data in an elongate photographic film strip characterized by successive frames and a magnetic layer, said method comprising:
dedicating respective ones of a plurality of predetermined longitudinal parallel track locations in said magnetic layer to respective predetermined information categories such that information categories relating to particular transactions are grouped together in said track locations;
assigning said data to one of said predetermined information categories;
magnetically recording said data in a magnetic track in the corresponding one of said plurality of predetermined longitudinal parallel track locations; and
recording different information within one of said predetermined information categories in different self-identifying data fields in the corresponding one of said tracks.

8. The method of claim 7 further comprising recording a different predetermined identification code in different ones of said fields.

9. The method of claim 8 wherein each one of said fields is characterized by a beginning and by an end which is adjacent the beginning of the next field in said track, wherein said method further comprises recording a field identification sentinel at the beginning of each one of said fields so as to delineate the end of the previous field and the beginning of the following field.

10. The method of claim 9 further comprising storing a look-up table converting information symbols to binary characters and reserving selected ones of said information symbols and the corresponding binary characters for use as said identification codes and as field identification sentinels, said method further comprising converting information to be magnetically recorded in said track to corresponding binary characters in accordance with said look-up table and recording said corresponding binary characters in said track.

11. The method of claim 10 further comprising allocating a certain one of said symbols for use by the manufacturer of said film as a field identification sentinel and allocating a different one of said symbols for use by other than said manufacturer as a field identification sentinel.

12. A film information exchange system for use in processing an elongate strip of photographic film having a magnetic layer, comprising:
first means for receiving said film and magnetically recording first data as at least a predetermined first one of a plurality of longitudinal parallel magnetic tracks in said magnetic layer; and
second means for receiving said film and for magnetically reading said first data recorded in said first track and for magnetically recording second data as a second predetermined one of said plurality of longitudinal parallel magnetic tracks in said magnetic layer, and wherein said first track is dedicated to the recording of said first data while said other track is dedicated to the recording of said second data.

13. The system of claim 12 wherein said first and second means are each comprised within a different one of:
film manufacturing means,
camera means,
order entry station means,
photofinishing means; and
wherein said first track is recorded prior to the recording of said second track, so that said second means responds to information recorded in said first track by said first means.

14. The system of claim 13 wherein different ones of said plural parallel tracks are dedicated to the magnetic recording of data by respective ones of said film manufacturing means, said camera means, said order entry station means and said photofinishing means.

15. The system of claim 14 further comprising:
third means for receiving said film and for magnetically reading the data recorded in said first and second tracks and for magnetically recording third data as a third predetermined one of said plurality of longitudinal parallel magnetic tracks in said magnetic layer, and wherein said third track is dedicated to the recording of said third data; and
fourth means for receiving said film and for magnetically reading the data recorded in said first, second and third tracks and for magnetically recording fourth data as a fourth predetermined one of said plurality of longitudinal parallel magnetic tracks in said magnetic layer, and wherein said fourth track is dedicated to the recording of said fourth data.

16. The system of claim 15 wherein said first, second, third and fourth means correspond, respectively, to said film manufacturing means, said camera means, said order entry station means and said photofinishing means.

17. The system of claim 16 wherein said first, second, third and fourth tracks are dedicated, respectively, to the recording of film manufacturing data, camera data, customer order data and photofinishing data.

18. An elongate photographic film strip characterized by successive frames and a plurality of perforations in said strip located sufficiently near one longitudinal edge thereof so as to be outside of image areas of said successive frames, the improvement comprising:
- a virtually transparent magnetic layer;
- a plurality of longitudinal peripheral tracks magnetically recorded in said magnetic layer and located sufficiently near one of the longitudinal edges of said film strip so as to be outside of image areas of said successive frames, different ones of said peripheral tracks containing magnetically recorded data relating to different data categories to which respective ones of said tracks have been dedicated; and
- a plurality of longitudinal interior tracks magnetically recorded in said magnetic layer, whereby each of said interior tracks is contained within an image area of a corresponding one of said frames, different ones of said interior tracks containing magnetically recorded data relating to different data categories to which respective ones of said tracks have been dedicated.

19. The film strip of claim 18 wherein said peripheral tracks are wider than said interior tracks so as to accommodate lateral film wander during writing of said peripheral tracks, said peripheral tracks being dedicated to the writing of data with a relatively large amount of lateral film wander and said interior tracks being dedicated to the writing of data with a relatively small amount of lateral film wander.

20. The film strip of claim 18 wherein said peripheral tracks are further dedicated to the reading and writing of data therein with some destruction of photosensitive layers in regions thereof in registration with said peripheral tracks, said interior tracks being further dedicated to the reading and writing of data therein with no destruction of said photosensitive layers in the image areas within said frames.

21. The film strip of claim 20 wherein said interior tracks are formed by a magnetic head recording process in which a magnetic head records data but does not contact said film strip with sufficient force to substantially harm said photosensitive layer, while said peripheral tracks are formed by a magnetic head recording process in which a magnetic head records data while not always avoiding contact with said film strip with sufficient force to substantially harm said photosensitive layer.

22. The film strip of claim 18 wherein said peripheral tracks are formed by the magnetic recording of data by a camera having means for recording such data while said interior tracks are formed by the magnetic recording of data by a photofinishing apparatus having means therein for recording such data.

23. The film strip of claim 22 wherein said peripheral tracks are dedicated to the recording of data within the category of scene-related photographic parameters as may be sensed by said camera and wherein said interior tracks are dedicated to the recording of data within the category of parameters pertaining to photofinishing instructions so as to provide a scratch-pad type of memory useful during photofinishing operations.

24. In an elongate photographic film strip characterized by successive frames and a plurality of perforations located along at least one longitudinal edge of said film strip, the location of said perforations being characterized in that an image area of each of said successive frames is adjacent a longitudinal imperforate peripheral area along said one longitudinal film strip edge, said film strip being suitable for use in a camera having a magnetic writing system and in a photofinishing system having a magnetic reading and writing system, the improvement comprising:
- a virtually transparent magnetic layer;
- longitudinal parallel camera-dedicated magnetic tracks recorded by said camera magnetic writing system in said magnetic layer within said longitudinal imperforate peripheral area; and
- longitudinal parallel photofinisher-dedicated tracks recorded by said magnetic reading and writing system of said photofinishing system in said magnetic layer within each of said frames.

25. The film strip of claim 24 wherein there is one perforation for each of said frames.

26. The film strip of claim 24 wherein said camera-dedicated tracks are each characterized by a first width and said photofinisher-dedicated tracks are characterized by a second width less than said first width, the difference between said two widths being sufficient to accommodate lateral wandering of said film strip in said camera during recording by said camera magnetic writing system.

27. The film strip of claim 24 wherein said camera-dedicated tracks are created by said camera magnetic writing system while said film strip is wound by said camera from one frame to the next between successive exposures of said film strip.

28. A photofinisher magnetic writing and reading system for use in a photofinishing system in which an elongate photographic film strip having a magnetic layer and successive frames, is developed and printed after exposure of said film strip by a camera, comprising:
- means for sensing whether data has previously been recorded in said magnetic layer as one or more longitudinal camera-dedicated tracks and for reading such data; and
- means for writing and reading data in said magnetic layer so as to create one or more longitudinal photofinisher-dedicated tracks.

29. The system of claim 28 wherein said photofinisher magnetic writing and reading system includes means for allocating each of said photofinisher-dedicated tracks to the recording of a corresponding predetermined group of parameters.

30. The system of claim 28 wherein said photofinisher magnetic writing and reading system comprises means for reading data recorded in said camera-dedicated tracks as well as means for reading data recorded in said photofinisher-dedicated tracks.

31. In an elongate photographic film strip for a still camera characterized by successive frames, the improvement comprising:
   a virtually transparent magnetic layer; and
   a plurality of longitudinal track locations in said magnetic layer, different ones of said track locations being specifically reserved for magnetically recorded data relating to predetermined different transactions associated with the processing and use of said film strip in still photography, and at least one of said track locations containing data recorded by a manufacturer of said film strip.

32. In a film information exchange system in which information is magnetically read and written in a virtually transparent magnetic layer of a film strip during different stages of film strip use and processing, the improvement comprising an information organizational method in which magnetic reading and writing of information is restricted to certain dedicated tracks extending longitudinally along the film strip, the choice of track being determined in accordance with the type of information being recorded and a predetermined arrangement in which individual ones of said tracks are dedicated to recording certain corresponding groups of related types of information relevant to individual ones of different transactions associated with the use or processing of the film strip, said different transactions being associated with the use and processing of the film strip in still photography, said different transactions comprising at least one of the following:
   recording of customer identification data,
   recording of image or camera related information with each exposure by a still camera,
   recording of print order information, and
   recording of photofinishing process control information for a given frame of the film strip; and
   said transactions being implemented by one or more of the following stages: a still camera, a dealer order entry station, a photofinisher order entry station, a classifier, a printer, an inspection station, an enveloper-sorter station, and a film to video player.

33. The improvement of claim 32 wherein substantially all information related to a particular transaction is recorded on the same track, so that implementation of said transaction can be accomplished by accessing the information on said track.

34. In an elongate photographic film strip characterized by successive frames, the improvement comprising:
   a magnetic layer; and
   a longitudinal track magnetically recorded in said magnetic layer, said track comprising at least one self-identifying data field, said self-identifying data field comprising data and a predetermined identification code which identifies the type of data recorded in the field.

35. The improved film strip of claim 34 wherein said track comprises a plurality of different self-identifying data fields.

36. A method of recording data of different data types in a magnetic layer of an elongate photographic film strip, comprising the steps of:
   assigning a different identification code to each of said different data types;
   determining the data type of particular data to be recorded; and
   recording the assigned identification code for the determined data type along with the particular data in the magnetic layer.

37. The method of claim 36 wherein the recorded particular data and assigned identification code for the determined data type comprise a self-identifying data field; and
   further comprising the step of recording data of different data types in different self-identifying data fields, said data fields extending along a longitudinal track in said magnetic layer.

38. In an elongate photographic film strip characterized by successive frames, the improvement comprising:
   a magnetic layer; and
   a longitudinal track magnetically recorded in said magnetic layer, said track comprising data recorded by a manufacturer of said film strip, said track beginning and ending within a respective frame.

39. The invention as in any one of claims 1-35, 36 and 37, in which each track or track location begins and ends within a respective frame.

40. A photofinisher magnetic writing and reading system for use in a photofinishing system in which an elongate film strip having a magnetic layer and successive frames, is developed and printed after exposure of said film strip by a camera, comprising:
   means for sensing whether data has previously been recorded in said magnetic layer, and for reading such data;
   means for storing instructions specifying a universal symbol dictionary of allowed characters representative of data and further specifying a universal dictionary of ID codes, each ID code uniquely defining a particular information type; and
   means for writing and reading data in said magnetic layer so as to create one or more longitudinal photofinisher-dedicated tracks in such a manner that each of said photofinisher-dedicated tracks is confined within a corresponding one of said frames with a predefined start sentinel character and a stop sentinel character recorded in said track at respective beginning and end points of said track, each track being divided into individual fields and each field being preceded by one of said ID codes corresponding to the type of data recorded in said field.

41. In an elongate photographic film strip characterized by successive frames, the improvement comprising:
   a magnetic recording area; and
   at least one self-identifying data field magnetically recorded in said magnetic area, said self-identifying data field comprising data and an assigned identification code which identifies the type of data recorded in the field.

42. The elongate photographic film strip characterized by successive frames of claim 41, the self-identifying data field comprising:
   data magnetically recorded by a manufacturer of said film strip.

43. In a stage of a film processing system which processes an elongate photographic film strip having successive frames and a magnetic recording area, the improvement comprising:
   means for recording at least one self-identifying data field in said magnetic area, said self-identifying data field comprising data and an assigned identification code which identifies the type of data recorded in the field.

44. The improved stage of claim 43 further comprising means for storing instructions specifying a universal symbol dictionary of allowed characters representative of data and further specifying a universal dictionary of assigned identification codes, each identification code uniquely defining a particular data type.

45. The improved stage of claim 44 wherein said stage comprises one of a camera and photofinishing apparatus.

* * * * *